(12) United States Patent
Konno et al.

(10) Patent No.: US 6,747,095 B2
(45) Date of Patent: Jun. 8, 2004

(54) CROSSLINKED RUBBER PARTICLES AND RUBBER COMPOSITIONS

(75) Inventors: Tomohisa Konno, Tokyo (JP);
Toshihiro Tadaki, Tokyo (JP);
Yoshiyuki Udagawa, Tokyo (JP);
Hiroshi Akema, Tokyo (JP)

(73) Assignee: JSR Corporation, Tokyo (JP)

( * ) Notice: Subject to any disclaimer, the term of this patent is extended or adjusted under 35 U.S.C. 154(b) by 62 days.

(21) Appl. No.: 09/842,162

(22) Filed: Apr. 26, 2001

(65) Prior Publication Data
US 2002/0007011 A1 Jan. 17, 2002

(30) Foreign Application Priority Data
Apr. 27, 2000 (JP) ........................................ 2000-128145

(51) Int. Cl.⁷ .............................................. C08L 53/00
(52) U.S. Cl. .............................. 525/89; 525/98; 525/99; 525/191; 525/914; 525/901; 524/495; 524/496; 252/511
(58) Field of Search ................................ 524/495, 496; 252/511; 525/191, 99, 98, 914, 89, 901

(56) References Cited

U.S. PATENT DOCUMENTS

| | | | |
|---|---|---|---|
| 4,365,042 A | * 12/1982 | Cooper et al. ................. 525/68 |
| 4,625,005 A | * 11/1986 | Miyabayashi et al. ...... 526/273 |
| 4,675,362 A | * 6/1987 | Miyabayashi et al. ...... 525/208 |
| 4,804,028 A | * 2/1989 | Botzman .................... 152/525 |
| 4,835,216 A | * 5/1989 | Morikawa et al. ............ 525/77 |
| 5,047,483 A | * 9/1991 | Halasa et al. ................ 525/237 |
| 5,219,938 A | * 6/1993 | Imai et al. ................... 525/102 |
| 5,658,987 A | * 8/1997 | Nakamura et al. ............ 525/99 |
| 6,127,472 A | * 10/2000 | Kobayashi et al. ......... 524/492 |
| 6,191,234 B1 | * 2/2001 | Tadaki et al. ............. 525/332.9 |
| 6,201,064 B1 | * 3/2001 | Aoyama et al. ............ 525/100 |
| 6,344,518 B1 | * 2/2002 | Kobayashi et al. ......... 524/862 |
| 6,458,883 B1 | * 10/2002 | Takashima et al. ......... 524/495 |

FOREIGN PATENT DOCUMENTS

| | | |
|---|---|---|
| EP | 0 864 927 | 9/1998 |
| EP | 1 020 492 | 7/2000 |
| EP | 1 051 061 | 11/2000 |
| GB | 1078400 | 8/1967 |
| JP | 3-177444 | 8/1991 |
| JP | 9-208623 | 8/1997 |
| JP | 9-208633 | 8/1997 |
| JP | 10-204217 | 8/1998 |
| JP | 10-204225 | 8/1998 |
| JP | 2001-31798 | 2/2001 |
| WO | WO 96/23027 | 8/1996 |

* cited by examiner

Primary Examiner—Tatyana Zalukaeva
(74) Attorney, Agent, or Firm—Oblon, Spivak, McClelland, Maier & Neustadt, P.C.

(57) ABSTRACT

An objective of the invention is to provide a rubber composition which has satisfactory processability and dimension stability, and the like, gives a vulcanized rubber exhibiting excellent wearing resistance and tensile strength, and the like, and thus is useful in a belt, a hose and a tire and the like, as well as a crosslinked rubber particle for obtaining such rubber composition. A rubber composition of the invention comprises [1] a crosslinked rubber particle comprising as repeating units (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated group, (d) one polymerizable unsaturated group and an amino group, a hydroxyl group and an epoxy group and (e) 0.1 to 30% by weight of a monomer unit having one polymerizable unsaturated group and a carboxylic group and having a particle size of 10 to 500 nm and a toluene-insolubles of 80% by weight or more and [2] a non-crosslinked rubber component whose toluene-insolubles is less than 20% by weight.

10 Claims, No Drawings

CROSSLINKED RUBBER PARTICLES AND RUBBER COMPOSITIONS

BACKGROUND OF THE INVENTION

1. Field of the Invention

The present invention relates to a certain crosslinked rubber particle and a rubber composition comprising as essential components such a crosslinked rubber particle and a non-crosslinked rubber component. A rubber composition of the invention exhibits an excellent processability, and also exhibits excellent handling performance and dimension stability, and the like especially when combined with a silica as a reinforcing agent. A vulcanized rubber obtained by vulcanizing a rubber composition of the invention can be used in various industrial field as a rubber product such as a belt, a hose, a roll, a tire, and the like.

2. Description of the Related Art

A starting rubber which has been employed frequently for a rubber product may for example be:

(A) a polymer whose repeating unit consists only of a conjugated diene unit such as a butadiene rubber, an isoprene rubber, a chloroprene rubber and a natural rubber;

(B) a polymer whose repeating units are a conjugated diene unit and an aromatic vinyl unit such as a styrene-butadiene copolymeric rubber, a styrene-isoprene copolymeric rubber and a styrene-isoprene-butadiene copolymeric rubber;

(C) a polymer whose repeating units are a conjugated diene unit and an $\alpha,\beta$-unsaturated nitrile unit such as an acrylonitrile-butadiene copolymeric rubber;

(D) a polymer in which an acrylate unit is essential as a repeating unit such as an acrylic rubber; and, (E) a polymer whose repeating units are ethylene and an $\alpha$-olefin having 3 to 12 carbon atoms optionally with a non-conjugated polyene, such as an ethylene-propylene rubber.

Any of these starting rubbers, when combined with a silica as a reinforcing agent, can provide a colored rubber product except for a black colored product, and a favorable performance of a formulated rubber made therefrom is a heat generation kept at a low level. However, unlike to a carbon black, a silica may lead to a problematic reduction in the tensile strength and the wearing resistance of a vulcanized rubber, and the like. Additional problems associated with the incorporation of a silica include ① a reduction in the processability and the compound consistency upon kneading, ② an insufficient smoothness of the surface of a sheet made from a compound using a roll and an irregular sheet edge accompanied with a substantial shrinkage upon cooling, and the like.

Such problems may be due to an aggregation of a silica instead of a sufficient dispersion. A rubber composition in which a silica is not dispersed sufficiently poses a difficulty in obtaining a certain reinforcing effect of the incorporation of a reinforcing agent and undergoes a heat generation attributable to the interaction between poorly dispersed silica particles, resulting in a substantial reduction in the processability. Such poor dispersion of a silica occurs possibly because of the reasons that a silica has a high self-interacting effect when compared with a carbon black and tends to aggregate easily and that a starting rubber usually consists of carbon and hydrogen and has a lower polarity when compared with a silica which leads to a low affinity with the silica.

For the purpose of increasing the affinity of a silica with a hydrocarbon-based rubber, the use of a conjugated diene-based rubber to which a functional group having an affinity with the silica is introduced has been investigated. For example, a conjugated diene-based rubber to which a hydroxyl group is introduced (WO96/23027), a conjugated diene-based rubber to which an alkoxysilyl group is introduced (JP-A 9-208623) and a conjugated diene-based rubber to which an alkoxysilyl group and an amino group or a hydroxyl group are introduced (JP-A 9-208633) have been proposed. However, such conjugated diene-based rubber to which a functional group described above is introduced mostly exhibits problematically poor dispersion, excessive heat generation upon processing and poor processability, and the like since it undergoes an extensive aggregation with a silica when the silica is admixed.

On the other hand, a silane coupling agent is incorporated usually for the purpose of preventing an aggregation of a silica and achieving a uniform dispersion. This results in an improvement in the dispersibility of a silica to some extent and a substantial improvement in the processability of a rubber composition and the tensile strength and the wearing resistance of a vulcanized rubber and the like. Nevertheless, the smoothness of the surface and the edge of a sheet or the problematic shrinkage of a sheet upon cooling or the like has not adequately been improved. Furthermore, a sufficient improvement in the processability, the tensile strength or the wearing strength or the like requires the incorporation of a silane coupling agent in an amount as high as 8 to 15% by weight based on a silica, but such silane coupling agent is expensive and increases the cost for a rubber composition.

SUMMARY OF THE INVENTION

The present invention overcomes the problems experienced conventionally as described above, and is intended to provide a rubber composition having excellent processability and handling performance, which are experienced as a satisfactory processability upon kneading, a smooth sheet surface, a regular sheet edge and a less shrinkage upon cooling, and the like. Another objective of the invention is to provide a crosslinked rubber particle from which a rubber composition described above can be prepared. A vulcanized rubber obtained by vulcanizing a rubber composition described above has excellent tensile strength and wearing resistance, and the like.

We made an effort to solve the problems mentioned above and discovered that by incorporating a crosslinked rubber particle component having a certain composition into a rubber composition, it is possible to obtain a rubber composition which exhibits a satisfactory processability upon kneading and achieves a satisfactory smoothness of the sheet surface and the sheet edge and a less sheet shrinkage upon cooling even when using a silica as a reinforcing agent. It was also discovered that by using this rubber composition it is possible to obtain a vulcanized rubber exhibiting a less heat generation and having sufficient tensile strength and wearing resistance, and the like. In addition, even when a silane coupling agent is used only in a reduced amount or is not used, the processability and the tensile strength, and the like were revealed to be improved sufficiently to the levels at which no practical problems are experienced.

The present invention is based on the findings described above and can be described as follows.

A crosslinked rubber particle comprising as repeating units (a) 30 to 94.89% by weight of a conjugated diene unit, (b) 5 to 69.89% by weight of an aromatic vinyl unit, (c) (0.01 to 10% by weight of a monomer unit having at least two polymerizable unsaturated group and (d) 0.1 to 30% by weight of a monomer unit having one polymerizable unsaturated group and at least one functional group selected from an amino group, a hydroxyl group and an epoxy group and having a particle size of 10 to 500 nm and a toluene-insolubles of 80% by weight or more.

In the crosslinked rubber particle, the monomer forming said monomer unit (d) having one polymerizable unsaturated group and an amino group is at least one selected from dialkylaminoalkyl (meth) acrylates, N-dialkylaminoalkyl group-containing unsaturated amides, dialkylaminoalkyl (meth)acrylate and tertiary amino group-containing vinyl aromatic compound.

In the crosslinked rubber particle, the monomer forming said monomer unit (d) having one polymerizable unsaturated group and a hydroxyl group is at least one selected from hydroxyalkyl (meth) acrylates, mono (meth)acrylates of polyalkylene glycols (the number of alkylene glycol units is 2 to 23), hydroxyl group-containing unsaturated amides, hydroxyl group-containing vinyl aromatic compounds and (meth)allyl alcohol.

In the crosslinked rubber particle, the monomer forming said monomer unit (d) having one polymerizable unsaturated group and an epoxy group is at least one selected from (meth)allylglycidylether, glycidyl (meth)acrylate and 3,4-oxycyclohexyl (meth)acrylate.

In a crosslinked rubber particle the conjugated diene forming said conjugated diene unit (a) is at least one selected from 1,3-butadiene, 2,3-dimethyl-1,3-butadiene, isoprene and chloroprene;

said aromatic vinyl forming said aromatic vinyl unit (b) is at least one selected from styrene, 2-methylstyrene, 3-methylstyrene, 4-methylstyrene, a-methylstyrene, 2,4-dimethylstyrene, 2,4-diisopropylstyrene, 4-tert-butylstyrene and tert-butoxystyrene; and, said monomer forming said monomer unit (c) having at least two polymerizable unsaturated groups is at least one selected from ethylene glycol di(meth)acrylate, propylene glycol di(meth)acrylate, 1,4-butanediol di(meth)acrylate, 1,6-hexanediol di(meth)acrylate, trimethyloipropane di(meth)acrylate, trimethyloipropane tri(meth)acrylate, pentaerythritol tri(meth)acrylate, pentaerythritol tetra(meth)acrylate, divinylbenzene, diisopropenylbenzene and trivinylbenzene.

In the crosslinked rubber particle, the monomer forming said monomer unit (d) having one polymerizable unsaturated group and an amino group is at least one selected from dialkylaminoalkyl (meth) acrylates, N-dialkylaminoalkyl group-containing unsaturated amides, dialkylaminoalkyl (meth)acrylate and tertiary amino group-containing vinyl aromatic compound.

In the crosslinked rubber particle, the monomer forming said monomer unit (d) having one polymerizable unsaturated group and a hydroxyl group is at least one selected from hydroxyalkyl(meth)acrylates, mono (meth)acrylates of polyalkylene glycols (the number of alkylene glycol units is 2 to 23), hydroxyl group-containing unsaturated amides, hydroxyl group-containing vinyl aromatic compounds and (meth)allyl alcohol.

In the crosslinked rubber particle, the monomer forming said monomer unit (d) having one polymerizable unsaturated group and an epoxy group is at least one selected from (meth)allylglycidylether, glycidyl (meth)acrylate and 3,4-oxycyclohexyl (meth)acrylate.

A rubber composition comprising:
at least one crosslinked rubber particle selected from:
(1) a crosslinked rubber particle comprising as repeating units (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated group and (d) 0.1 to 30% by weight of a monomer unit having one polymerizable unsaturated group and at least one functional group selected from an amino group, a hydroxyl group and an epoxy group and having a particle size of 10 to 500 nm and a toluene-insolubles of 80% by weight or more;
(2) a crosslinked rubber particle comprising as repeating units (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated group and (e) 0.1 to 30% by weight of a monomer unit having one polymerizable unsaturated group and a carboxylic group ($CO_2H$ and/or $CO_2^-$) and having a particle size of 10 to 500 nm and a toluene-insolubles of 80% by weight or more; and,
(3) a crosslinked rubber particle comprising as repeating units (a) 30 to 94.99% by weight of a conjugated diene unit, (b) 5 to 69.99% by weight of an aromatic vinyl unit and (c) 0.01 to 10% by weight of a monomer unit having at least two polymerizable unsaturated group and having a particle size of 10 to 500 nm and a toluene-insolubles of 80% by weight or more; and,
a non-crosslinked rubber component whose toluene-insolubles is less than 20% by weight,
wherein said non-crosslinked rubber component is at least one selected from (A) a polymer consisting of as a repeating unit only a conjugated diene unit, (B) a polymer which comprises as repeating units a conjugated diene unit and an aromatic vinyl unit and whose conjugated diene unit has a 1,4-trans content of 55% or less, (C) a polymer comprising as repeating units a conjugated diene unit and an α, β-unsaturated nitrile unit, (D) an acrylic rubber and (E) a polymer comprising as repeating units an ethylene unit and an α-olefin unit having 3 to 12 carbon atoms.

In a rubber composition the conjugated diene forming said conjugated diene unit (a) is at least one selected from 1,3-butadiene, 2,3-dimethyl-1,3-butadiene, isoprene and chloroprene;

said aromatic vinyl forming said aromatic vinyl unit (b) is at least one selected from styrene, 2-methylstyrene, 3-methylstyrene, 4-methylstyrene, α-methylstyrene, 2,4-demethylstyrene, 2,4-diisopropylstyrene, 4-tert-butylstyrene and tert-butoxystyrene; and, said monomer forming said monomer unit (c) having at least two polymerizable unsaturated groups is at least one selected from ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene.

In the rubber composition, the monomer forming said monomer unit (d) having one polymerizable unsaturated group and an amino group is at least one selected from dialkylaminoalkyl (meth) acrylates, N-dialkylaminoalkyl group-containing unsaturated amides and tertiary amino group-containing vinyl aromatic compound.

In the rubber composition, the monomer forming said monomer unit (d) having one polymerizable unsaturated group and a hydroxyl group is at least one selected from hydroxyalkyl(meth)acrylates, mono (meth)acrylates of a polyalkylene glycol (the number of alkylene glycol units is for example 2 to 23), hydroxyl group-containing unsaturated amides, hydroxyl group containing unsaturated vinyl aromatic compounds and (meth)allyl alcohol.

In the rubber composition, the monomer forming said monomer unit (d) having one polymerizable unsaturated group and an epoxy group is at least one selected from (meth)allylglycidylether, glycidyl (meth)acrylate and 3,4-oxycyclohexyl (meth)acrylate.

In the rubber composition, the monomer forming said monomer unit (e) having one polymerizable unsaturated group and a carboxylic group ($CO_2H$ and/or $CO_2^-$) is at least one selected from unsaturated carboxylic acids, free carboxyl group-containing esters and their salts.

The rubber composition further comprising at least one selected from a silica and a carbon black.

In a rubber composition the conjugated diene forming said conjugated diene unit (a) is at least one selected from 1,3-butadiene, 2,3-dimethyl-1,3-butadiene, isoprene and chloroprene;

said aromatic vinyl forming said aromatic vinyl unit (b) is at least one selected from styrene, 2-methylstyrene, 3-methylstyrene, 4-methylstyrene, α-methylstyrene, 2,4-demethylstyrene, 2,4-diisopropylstyrene, 4-tert-butylstyrene and tert-butoxystyrene; and, said monomer forming said monomer unit (c) having at least two polymerizable unsaturated groups is at least one selected from ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethyloipropane tri(meth)acrylate, pentaerythritol tri(meth)acrylate, pentaerythritol tetra(meth)acrylate, divinylbenzene, diisopropenylbenzene and trivinylbenzene.

In the rubber composition, the monomer forming said monomer unit (e) having one polymerizable unsaturated group and a carboxylic group ($CO_2H$ and/or $CO_2^-$) is at least one selected from unsaturated carboxylic acids, free carboxyl group-containing esters and their salts.

The rubber composition further comprising a silane coupling agent.

According to the invention, by using a crosslinked rubber particle and the like, especially when using a silica as a reinforcing agent, a rubber composition having satisfactory processability and dimension stability, and the like can be obtained.

DETAILED DESCRIPTION OF THE INVENTION

A crosslinked rubber particle of the invention comprises as repeating units (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated group and (d) 0.1 to 30% by weight of a monomer unit having one polymerizable unsaturated group and at least one functional group selected from an amino group, a hydroxyl group and an epoxy group [the total amount of (a), (b), (c) and (d) is 100% by weight] and having a particle size of 10 to 500 nm and a toluene-insolubles of 80% by weight or more.

Another rubber composition of the invention comprises [1] at least one selected from (1) a crosslinked rubber particle described above, (2) a crosslinked rubber particle comprising as repeating units (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated group and (e) 0.1 to 30% by weight of a monomer unit having one polymerizable unsaturated group and a carboxylic group ($CO_2H$ and/or $CO_2^-$) [the total amount of (a), (b), (c) and (e) is 100% by weight] and having a particle size of 10 to 500 nm and a toluene-insolubles of 80% by weight or more and (3) a crosslinked rubber particle similar to (1) except for using no monomer unit (d) and [2] a non-crosslinked rubber component whose toluene-insolubles is less than 20% by weight, wherein said non-crosslinked rubber component [2] is at least one selected from (A) a polymer comprising as a repeating unit only a conjugated diene unit, (B) a polymer which comprises as repeating units a conjugated diene unit and an aromatic vinyl unit and whose conjugated diene unit has a 1,4-trans content of 55% or less, (C) a polymer comprising as repeating units a conjugated diene unit and an α,β-unsaturated nitrile unit, (D) an acrylic rubber and (E) a polymer comprising as repeating units an ethylene unit and an α-olefin unit having 3 to 12 carbon atoms.

A "crosslinked rubber particle" described above consists of (a) a monomer which forms a conjugated diene unit (hereinafter referred to as "Monomer ①"), (b) a monomer unit which forms an aromatic vinyl unit (hereinafter referred to as "Monomer ②"), (c) a monomer which forms a monomer unit having at least two polymerizable unsaturated group (hereinafter referred to as "Monomer ③") and (d) a monomer which forms a monomer unit having one polymerizable unsaturated group and at least one functional group selected from an amino group, a hydroxyl group and an epoxy group hereinafter referred to as "Monomer ④"). Anther polymerizable unsaturated monomer described below (hereinafter referred to as "Monomer ⑥") can also be employed.

In the present invention, at least one selected from (1) a crosslinked rubber particle consisting of Monomers ① to ④, (2) a crosslinked rubber particle consisting of Monomers ① to ③ and a monomer having one polymerizable unsaturated group and a carboxylic group (hereinafter referred to as "Monomer ⑤") and (3) a crosslinked rubber particle consisting of Monomers ① to ③. Each of (1), (2) and (3) may be combined with Monomer ⑥.

A crosslinked rubber particle described above is a particulate rubber whose toluene-insolubles based on the solid of the filtrate obtained by a filtration through a 100 mesh-sized wire mesh after immersing in 100 ml of toluene at room temperature for 24 hours is 80% by weight or more and whose particle size determined using a laser particle size analysis system (OTSUKA DENSHI Co., Ltd., Model LPA-3100) is 10 to 500 nm, particularly 30 to 500 nm.

A crosslinked rubber particle can be produced using Monomers ① to ③ or ④ or ⑤ optionally with Monomer ⑥ by an emulsion polymerization, a suspension polymerization, and the like. Thus, a polymerization of Monomers ①, ②, ④ and ⑤ optionally with Monomer ⑥ in an aqueous medium, as is usual in a production of a rubber by an emulsion polymerization, is performed in the presence of Monomer ③ which has at least 2 polymerizable functional groups and to which a crosslinking structure can be introduced by a copolymerization, whereby producing a crosslinked rubber particle of the invention or a crosslinked rubber particle which forms a rubber composition of the invention.

Monomer ① may for example be 1,3-butadiene, 2,3-dimethyl-1,3-butadiene, isoprene and chloroprene, and the like. Any of these Monomers ① may be used alone or in combination of two or more.

In a repeating unit of a crosslinked rubber particle, the unit of Monomer ① is present in an amount of 30 to 94.89% by weight, particularly 40 to 94.8% by weight. In a crosslinked rubber particle (3) consisting of Monomers ① to ③ according to the invention, the amount of Monomer ① is 30 to 94.99% by weight, preferably 40 to 94.9% by weight. An amount of Monomer ① less than the lower limit specified above leads to a difficulty in improving the processability, resulting in a reduced tensile strength and the like of a vulcanized rubber.

Monomer ② may for example be acrylonitrile, methacrylonitrile and derivatives thereof, with acrylonitrile being preferred. Any of these Monomers ② may be used alone or in combination of two or more.

In a repeating unit of a crosslinked rubber particle, the unit of Monomer ② is present in an amount of 5 to 69.89% by weight, particularly 5 to 50% by weight. In a crosslinked rubber particle (3) consisting of Monomers ① ③ according to the invention, the amount of Monomer ② is 5 to 69.99% by weight, particularly 5 to 50% by weight. An amount of Monomer ② exceeding the upper limit specified above leads to a reduced processability.

Monomer ③ may for example be (1)alkyl (meth)acrylates such as methyl (meth)acrylate, ethyl (meth)acrylate, n-propyl (meth)acrylate, iso-propyl (meth)acrylate, n-butyl (meth)acrylate, iso-butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate and decyl (meth)acrylate, and the like as well as (2) alkoxyalkyl (meth)acrylates such as methoxymethyl (meth)acrylate, methoxyethyl (meth)acrylate, methoxypropyl (meth)acrylate, ethoxymethyl (meth)acrylate, ethoxyethyl (meth)acrylate, ethoxypropyl (meth)acrylate and butoxyethyl (meth)acrylate, and the like. Any of these Monomers ③ may be employed alone or in combination of two or more, and a combination of different types may also be used.

In a repeating unit of a crosslinked rubber particle, the unit of Monomer ③ is present in an amount of 0.01 to 10% by weight, particularly 0.1 to 10% by weight. An amount of Monomer ③ less than 0.01% by weight leads to an insufficiently raised crosslinking degree of the crosslinked rubber particle, resulting in a difficulty in maintaining the particle shape during a processing, which lead in turn to a difficulty in improving the processability of a rubber composition. On the other hand, an amount exceeding 10% by weight leads also problematically to a substantially reduced tensile strength of a vulcanized rubber.

Monomer ④ is preferably a monomer having a tertiary amino group and may for example be those listed below.

(a) Dialkylaminoalkyl (meth)acrylates such as dimethylaminomethyl (meth)acrylate, diethylaminomethyl (meth)acrylate, 2-dimethylaminoethyl (meth)acrylate, 2-diethylaminoethyl (meth)acrylate, 2-dimethylaminoethyl (meth)acrylate, 2-diethylaminoethyl (meth)acrylate, 2-(d-n-propylamino)ethyl (meth)acrylate, 2-dimethylaminopropyl (meth)acrylate, 2-diethylaminopropyl (meth)acrylate, 2-(d-n-propylamino)propyl (meth)acrylate, 3-dimethylaminopropyl (meth)acrylate, 3-diethylaminopropyl (meth)acrylate and 3-(d-n-propylamino)propyl (meth)acrylate, and the like (b) N-dialkylaminoalkyl group-containing unsaturated amides such as N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3-dimethylaminopropyl) (meth)acrylamide and N-(3-diethylaminopropyl) (meth)acrylamide, (c) tertiary amino group-containing vinyl aromatic compound, such as N,N-dimethyl-p-aminostyrene, N,N-diethyl-p-aminostyrene, dimethyl(p-vinylbenzyl)amine, diethyl(p-vinylbenzyl)amine, dimethyl(p-vinylphenethyl)amine, diethyl(p-vinylphenethyl)amine, dimethyl(p-vinylbenzyloxymethyl)amine, dimethyl[2-(p-vinylbenzyloxy)ethyl]amine, diethyl(p-vinylbenzyloxymethyl)amine, diethyl[2-(p-vinylbenzyloxy) ethyl] amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine, and the like.

Among these listed above, a dialkylaminoalkyl (meth)acrylate and a tertiary amino group-containing vinyl aromatic compound are preferred. Any of these amino group-containing monomers may be employed alone or in combination of two or more.

A hydroxyl group-containing monomer may for example be:

(a) hydroxyalkyl (meth)acrylates such as 2-hydroxyethyl (meth)acrylates, 2-hydroxypropyl (meth)acrylates, 3-hydroxypropyl (meth)acrylates, 2-hydroxybutyl (meth)acrylates, 3-hydroxybutyl (meth)acrylates and 4-hydroxybutyl (meth)acrylates, and the like (b) mono (meth)acrylates of a polyalkylene glycol (the number of alkylene glycol units is for example 2 to 23) such as polyethylene glycol, polypropylene glycol, and the like.

(c) hydroxy group-containing unsaturated amides such as N-hydroxymethyl (meth)acrylamide, N-(2-hydroxyethyl) (meth)acrylamide and N,N-bis(2-hydroxyethyl) (meth)acrylamide, and the like (d) hydroxy group-containing vinyl aromatic compounds such as o-hydroxystyrene, m-hydroxystyrene, p-hydroxystyrene, o-hydroxy-a-methylstyrene, m-hydroxy-a-methylstyrene, p-hydroxy-a-methylstyrene and p-vinylbenzyl alcohol, and the like, (e) (meth)allyl alcohol and the like.

Among those listed above, hydroxyalkyl (meth)acrylates and hydroxyl group-containing vinyl aromatic compounds are preferred. Any of the hydroxyl group-containing monomers may be employed alone or in combination of two or more.

An epoxy group-containing monomer may for example be (meth)allylglycidylether, glycidyl (meth)acrylate and 3,4-oxycyclohexyl (meth)acrylate, and the like. Any of these epoxy group-containing monomers may be employed alone or in combination of two or more.

Monomer ⑤ may for example be (a) unsaturated carboxylic acids such as (meth)acrylic acid, maleic acid, fumaric acid, itaconic acid, tetraconic acid and cinnamic acid, (b) free carboxylic group-containing esters such as a monoester of a non-polymerizable multivalent carboxylic acid such as phthalic acid, succinic acid and adipic acid, and the like with a hydroxy group-containing unsaturated compound such as (meth)allyl alcohol and 2-hydroxyethyl (meth)acrylate, and the like as well as their salts.

Among those listed above, unsaturated carboxylic acids are preferred. Any of these carboxylic group-containing monomers may be employed alone or in combination of two or more, and a combination of different types may also be used.

Each of Monomers ④ and ⑤ can be selected and used as desired. Two or more of an amino group, a hydroxyl group and an epoxy group in Monomer ④ may be employed in combination. For example, an amino group-containing monomer and a hydroxyl group-containing monomer can be used in combination as Monomer ④.

In a repeating unit of a crosslinked rubber particle, the unit of Monomer ④ and Monomer ⑤ is present in an amount of 0.1 to 30% by weight, particularly 0.3 to 15% by weight. An amount of the unit of Monomer ④ and Monomer ⑤ less than 0.1% by weight leads to an insufficient affinity of the crosslinked rubber particle with a silica, resulting in an insufficient improvement in the processability of the rubber composition. On the other hand, an amount exceeding 30% by weight leads to a strong coagulation between the crosslinked rubber particle and a silica, resulting in a reduced processability.

Monomer ⑥ may is not limited to a particular type as long as it is a compound having one copolymerizable unsaturated group.

Such Monomer ⑤ may for example be (meth)acrylonitrile, vinylidene cyanide, vinyl chloride, vinylidene chloride, (meth)acrylamide, maleimide, methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, tert-butyl (meth)acrylate, n-amyl (meth)acrylate, n-hexyl (meth)acrylate, 2-ethylhexyl (meth)acrylate and cyclohexyl (meth)acrylate, and the like. Any of these Monomers ⑥ may be employed alone or in combination of two or more.

The amount of Monomer ⑥, when employed, based on 100 parts by weight (hereinafter abbreviated as "parts") as the total of Monomers ①, ②, ③, ④, and ⑤ is 0.1 to 50 parts, especially 0.5 to 30 parts.

The particle size of a crosslinked rubber particle is "10 to 500 nm", preferably 30 to 500 nm, more preferably 30 to 200 nm. A particle size exceeding 500 nm leads to an insufficient dispersion of the crosslinked rubber particle in a rubber composition, resulting in a reduced processability. The particle size of this crosslinked rubber particle, in the case of an emulsion polymerization, can be controlled by selecting the types and the amounts, and the like of the emulsion and the electrolytes employed appropriately. The toluene-insolubles of a crosslinked rubber particle, based on the solid of the filtrate obtained by a filtration through a 100 mesh-sized wire mesh after immersing in 100 ml of toluene at room temperature for 24 hours, is "80% by weight or more", preferably 85% by weight or more. A toluene-insolubles less than 80% by weight leads to an insufficient improvement in the processability.

While a crosslinked rubber particle can be produced using a radical initiator by an emulsion or suspension polymerization, it is produced preferably by an emulsion polymerization in view of the uniformity in the particle size.

A radical initiator can be an organic peroxide such as benzoyl peroxide, lauroyl peroxide, tert-butyl hydroperoxide, cumene hydroperoxide, p-menthane hydroperoxide, di-tert-butyl peroxide and dicumyl peroxide, and the like. In addition, an azo compound such as azobisisobutyronitrile, an inorganic peroxide such as potassium persulfate, and a redox catalyst and the like such as a combination of any of these peroxides with ferrous sulfate may also be employed. Any of these radical initiators may be employed alone or in combination of two or more, and a combination of different types may also be used.

A chain transferring agent such as mercaptans including tert-dodecylmercaptane and n-dodecylmercaptane, and the like, carbon tetrachloride, thioglycols, diterpene, terpinolene and γ-terpinene, and the like may also be used in combination.

An emulsifier employed in an emulsion polymerization may for example be an anionic surfactant, a nonionic surfactant, a cationic surfactant as well as an amphoteric surfactant and the like. A fluorine-based surfactant may also be employed. Any of these emulsifier may be employed alone or in combination of two or more, and a combination of different types may also be used.

A suspension stabilizer employed in a suspension polymerization may for example be polyvinyl alcohol, sodium polyacrylate and hydroxyethyl cellulose, and the like. Any of these suspension stabilizers may be employed alone or in combination of two or more.

In an emulsion or suspension polymerization, each monomer and a radical initiator, and the like may be added all at once prior to the initiation of the polymerization, or they may be added continuously or intermittently over the period of the reaction. The polymerization may be effected in an oxygen-free reactor at 0 to 80° C. with changing temperature or stirring condition or the like as desired during the reaction. The polymerization may be of a continuous system or a batch system.

A "non-crosslinked rubber component" described above is at least one selected from the polymers (A) to (E) shown below.

(A) a polymer comprising as a repeating unit only a conjugated diene unit;

(B) a polymer comprising as repeating units a conjugated diene unit whose 1,4-trans content is less than 55% and an aromatic vinyl unit;

(C) a polymer comprising as repeating units a conjugated diene unit and an α,β-unsaturated nitrile unit, which may contain an acrylate unit and an aromatic vinyl unit if desired;

(D) an acrylic rubber usually containing 50% by weight or more of acrylates, which may contain, for the purpose of introducing an unsaturated group, a monomer unit having two or more polymerizable carbon—carbon double bonds in its molecule(formed from Monomer ⑦); and, (E) a polymer comprising as repeating units an ethylene unit (formed only from ethylene) and an α-olefin unit having 3 to 12 carbon atoms (formed from Monomer ⑧), which may contain a non-conjugated polyene unit (formed from Monomer ⑨) if desired.

It is possible to form a conjugated diene unit forming non-crosslinked rubber components (A) to (D) using a monomer similar to Monomer ① in a crosslinked rubber particle, an aromatic vinyl unit forming a non-crosslinked rubber component (B) using a monomer similar to Monomer ② in a crosslinked rubber particle, an α,β-unsaturated nitrile unit forming a non-crosslinked rubber component (C) using a monomer similar to a part of Monomer ⑥ in a crosslinked rubber particle, and an acrylate unit forming non-crosslinked rubber component (C) and (D) using a monomer similar to a part of Monomer ⑥ in a crosslinked rubber particle.

In an acryl rubber as non-crosslinked rubber component (D), Monomer ⑦ having in its molecule two or more polymerizable carbon—carbon double bonds used for introducing an unsaturated group preferably has 5 to 25 carbon atoms. Monomer ⑦ may for example be vinyl methacrylate, vinyl acrylate, allyl methacrylate, dicyclopentenyloxyethyl acrylate, 1,1-dimethylpropenyl methacrylate, 1,1-dimethylpropenyl acrylate, 1,1-dimethyl-3-butenyl methacrylate, 1,1-dimethyl-3-butenyl acrylate, divinyl itaconate, divinyl maleate, vinyl 1,1-dimethylpropenylether, vinyl 1,1-dimethyl-3-butenylether and 1-acroyloxy-1-phenylethene. Among those listed above, vinyl methacrylate, allyl methacrylate and dicyclopentenyloxyethyl acrylate are preferred particularly. Any of these Monomers ⑦ may be employed alone or in combination of two or more.

A monomer which forms an ethylene unit in non-crosslinked rubber component (E) is ethylene. Monomer ⑧ may for example be propylene, 1-butene, 1-pentene, 1-hexene, 4-methyl-1-pentene, 1-heptene, 5-methyl-1-hexene, 1-octene, 1-nonene, 5-ethyl-1-hexene, 1-decene and 3-methyl-1-butene. Among those listed above, 1-hexene and 1-octene are preferred particularly. Any of these Monomers ⑧ may be employed alone or in combination of two or more.

While any of ordinarily employed non-conjugated dienes may be employed as Monomer ⑨ without any limitation, it is classified conveniently into two classes based on the formation of a branched chain in a resultant polymer.

A non-conjugated diene giving a polymer having a branched chain may for example be dicyclopentadiene, 2,5-norbornadiene, 5-vinyl-2-norbornene as well as an aliphatic α,ω-diene having 6 to 20 carbon atoms and the like. Such aliphatic α,ω-diene may for example be 1,5-hexadiene, 1,6-heptadiene, 1,7-octadiene, 1,8-nonadiene and 1,9-decadiene, and the like.

A non-conjugated diene giving a polymer having no branched chain may for example be 5-ethylidene-2-norbornene, 5-methylene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2'-dicyclopentenyl-trans-1,2-diviylcyclobutane, 2-methyl-1,4-hexadiene, 1,6-octadiene, 1,4-hexadiene, 7-methyl-1,6-octadiene, 5,7-dimehyl-1,6-octadiene, 0 3,7-dimethyl-1,6-octadiene, 1,4,7-octatriene, dicyclooctadiene methylenenorbornene, and the like.

Among these non-conjugated polyenes, preferred ones giving polymers having branched chains are 1,9-decadiene and dicyclopentadiene. Preferred ones giving polymers having no branched chains are 5-ethylidene-2-norbornene, 1,4-hexadiene, 7-methyl-1,6-octadiene and 5,7-dimethyl-1,6-octadiene. While any of these non-conjugated polyenes may be employed alone or in combination of two or more, it is preferable to use at least one giving a polymer having a branched chain and at least one giving a polymer having no branched chain.

A non-crosslinked rubber component selected from (A) to (E) may be one of those shown below.

(A) Polymer comprising as repeating unit only conjugated diene unit;
① An emulsion-polymerized polybutadiene rubber, ② a high-cis-polybutadiene rubber prepared using a Ziegler catalyst whose main components are a compound of a transition metal such as Ti, Ni and Co and an organic aluminium compound or a catalyst comprising an Nd compound and an organic aluminium compound, ③ a high-trans-polybutadiene polybutadiene rubber prepared using a catalyst comprising a Ba compound and an organic magnesium compound or an organic aluminium compound and ④ an emulsion-polymerized polyisoprene rubber, a high-cis-polyisoprene rubber, a butadiene-isoprene copolymeric rubber, a natural rubber and a chloroprene rubber, and the like (B) Polymer comprising as repeating units conjugated diene unit whose 1,4-trans content is less than 55% and aromatic vinyl unit 20 to 50% by weight;
A styrene-butadiene random copolymeric rubber, a styrene-butadiene block copolymeric rubber, a styrene-isoprene random copolymeric rubber, a styrene-isoprene-butadiene random copolymeric rubber, a styrene-butadiene-styrene triblock copolymeric rubber and a styrene-isoprene-styrene triblock copolymeric rubber, and the like (C) Polymer comprising as essential repeating units conjugated diene unit and α,β-unsaturated nitrile unit 5 to 60% by weight, optionally with aromatic vinyl unit and acrylate unit;
An acrylonitrile-butadiene copolymeric rubber, an acrylonitrile-isoprene copolymeric rubber, an acrylonitrile-styrene-butadiene copolymeric rubber and an acrylonitrile-styrene-isoprene copolymeric rubber, and the like (D) Acrylic rubber containing acrylate more than 50% by weight and acrylate-butadiene copolymeric rubber, and the like (E) Polymer comprising as essential repeating units ethylene unit and α-olefin unit having 3 to 12 carbon atoms, optionally with a non-conjucated polyene unit;
An ethylene/propylene copolymeric rubber, an ethylene/1-butene copolymeric rubber, an ethylene/1-pentene copolymeric rubber, an ethylene/1-hexene copolymeric rubber and an ethylene/1-octene copolymeric rubber and the like, and an ethylene/propylene/diene copolymeric rubber and the like having a monomer unit which forms a non-conjugated polyene unit such as ethylene/propylene/5-ethylidene-2-norbornene, and the like.

A non-crosslinked rubber component into which at least one functional group selected from an amino group, a hydroxyl group, an epoxy group and a carboxyl group is introduced can also be employed in a rubber composition of the invention. A monomer for introducing such functional group may be one similar to that in a crosslinked rubber particle. Furthermore, a non-crosslinked rubber composition copolymerized with a monomer having an alkoxysilyl group shown below can also be employed.

An alkoxysilyl group-containing monomer may for example be:
(meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, (meth)acryloxypropyl dimethylmehtoxysilane, γ-(meth)acryloxypropyl triethoxysilane, γ-(meth)acryloxypropyl methyldiethoxysilane, γ-(meth)acryloxypropyl dimethylethoxysilane, γ-(meth) acryloxypropyl tripropoxysilane, γ-(meth) acryloxypropyl methyldipropoxysilane, γ-(meth) acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane and γ-(meth) acryloxypropyl dimethyliphenoxysilane. Any of these alkoxysilyl group-containing monomers may be employed alone or in combination of two or more.

Any of the monomer types in the invention may be employed alone or in combination of two or more, and a combination of different types may also be used. A concomitant use of an alkoxysilyl group can serve to raise the affinity of a silica with a non-crosslinked rubber component.

A non-crosslinked rubber component can be produced by subjecting respective constituent monomers to an emulsion polymerization or a suspension polymerization. A non-crosslinked rubber composition into which a functional group is introduced can be produced using Monomer ④, ⑤ employed for forming a crosslinked rubber particle or an alkoxysilyl group-containing monomer also by an emulsion polymerization or a suspension polymerization. While the polymerization method employed here is not particularly limited, an emulsion polymerization are preferred generally.

A toluene-insolubles based on the solid remained in the filtrate obtained by a filtration through a 100 mesh-sized wire mesh after immersing a non-crosslinked rubber composition in 100 ml of toluene at room temperature for 24 hours is "20% by weight or less", preferably 15% by weight or less, more preferably 10% by weight or less. The weight-average molecular weight represented as polystyrene determined by a GPC (gel permeation chromatography) is 50000 to 2000000.

A rubber composition of the invention preferably contains, based on 100 parts by weight as the total of the rubber components contained in this rubber composition, 1 to 70 parts of a crosslinked rubber particle component and 30 to 99 parts of a non-crosslinked rubber component. An amount of the crosslinked rubber particle component less than 1 part results in a low processability-improving effect, while one exceeding 70 parts gives a vulcanized rubber having problematically deteriorated physical characteristics.

A rubber composition of the invention, when used practically, may usually be supplemented with a reinforcing agent. Such reinforcing agent may be a "silica" especially.

A silica may be one used generally as a white reinforcing agent. The amount of the silica based on 100 parts as the total amount of a crosslinked rubber particle and a conjugated diene/aromatic vinyl copolymeric rubber is 2 to 120 parts, preferably 10 to 100 parts, more preferably 30 to 100 parts. An amount of the silica less than 2 parts may leads to a problematically insufficient reinforcing effect. On the other hand, an amount of 120 parts is enough for obtaining a sufficient reinforcing effect, and no further amount is required.

While the type of a silica is not particularly limited, a wet process type white carbon, a dry process type white carbon, a colloidal silica and a precipitated silica, and the like described in Japanese Patent laid-open publication 62-62838 can be employed. Among those listed above, a wet process type white carbon whose main component is silicic hydrate is preferred particularly. Any of these silica-based compound may be employed alone or in combination of two or more. While the specific surface area of the silica is not particularly limited, a nitrogen absorption specific surface area (area determined by BET method in accordance with ASTM D3037-81) is usually 50 to 400 $m^2/g$, preferably 50 to 220 $m^2/g$, more preferably 70 to 220 $m^2/g$, for the purpose of achieving a sufficient improvement in the reinforcing performance, the wearing resistance and the exothermic behavior, and the like.

A combination of a silica and a carbon black can be employed as a reinforcing agent. When a silica and a carbon black are employed in combination, their total amount is preferably 10 to 120 parts, more preferably 40 to 100 parts based on 100 parts as the total of a crosslinked rubber particle component and a non-crosslinked rubber composition. A total amount less than 10 parts may lead to a problematically insufficient reinforcing effect. On the other hand, an amount of 120 parts is enough for obtaining a sufficient reinforcing effect, and no further amount is required. While the weight ratio of a silica and a carbon black is not particularly limited, 100 parts of the silica is combined preferably with 5 to 200 parts, especially 10 to 150 parts of the carbon black. Within the range of the weight ratio specified above, a vulcanized rubber having excellent tensile strength and the like can be obtained.

While the type of a carbon black or the like is not particularly limited, those which may be employed are a furnace black, an acetylene black, a thermal black, a channel black, a graphite, and the like. Among those listed above, a furnace black is preferred including SAF, ISAF, ISAF-HS, ISAF-LS, IISAF-HS, HAF, HAF-HS, HAF-LS, FEF, and the like. Any of these carbon blacks may be employed alone or in combination of two or more.

While the nitrogen absorption specific surface area of a carbon black determined similarly to a silica is not particularly limited, it is usually 5 to 200 $m^2/g$, preferably 50 to 150 $m^2/g$, more preferably 80 to 130 $m^2/g$, for the purpose of achieving a sufficient improvement in the tensile strength and the wearing resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in the tensile strength and the wearing resistance, and the like. A further improvement in the wearing resistance can be achieved by using as a carbon black a high structure carbon black described in Japanese Patent laid-open publication 5-230290, whose cetyltrimethylammonium bromide absorption specific surface area is 110 to 170 $m^2/g$ and whose DBP (24M4 DBP) oil absorption level after compressing under 165 MPa four times repetitively is 110 to 130 ml/100 g.

A carbon-silica dual-phase filler as a reinforcing agent may also be added.

A rubber composition of the invention can be supplemented with various components shown below in addition to a reinforcing agent described above.

A clay, calcium carbonate and/or magnesium carbonate, and the like as a filler, each in an appropriate amount, may also be added. A petroleum-based formulated oil such as an aromatic process oil, a naphthene-based process oil and a paraffin-based process oil, and the like may also be added as a rubber extending oil. Such extending oil is preferably an aromatic or naphthene-based process oil.

When a silica is employed as a reinforcing agent, a concomitant use of a silane coupling agent serves to further improve the balance between the processability and the reinforcing performance. The amount of the silane coupling agent to be incorporated is less than 20 parts, preferably less than 12 parts based on 100 parts of the silica. One which can also be employed as an activator is diethylene glycol, polyethylene glycol, a silicone oil, triethanolamine, tri-isopropanolamine and the like. An anti-aging agent and a processing aid may additionally be employed in appropriate amounts.

A crosslinking agent may for example be a sulfur such as a powdered sulfur, a precipitated sulfur, a colloidal sulfur, an insoluble sulfur and a highly dispersible sulfur, and the like, a halogenated sulfur such as sulfur monochloride, sulfur dichloride, and the like, an organic peroxide such as dicumyl peroxide and di-t-butyl peroxide, and the like, a quinone dioxime such as p-quinone dioxime and p,p'- dibenzoylquinone dioxime, an organic multivalent amine compound such as triethylene tetramine, hexamethylenediamine carbamate and 4,4'-methylenebis-o-chloroaniline as well as an alkylphenol resin having a methylol group and the like. Among those listed above, a sulfur is preferred and a powdered sulfur is particularly preferred. Any of these crosslinking agents may be employed alone or in combination of two or more, and a combination of different types may also be used.

A crosslinking agent may be present in an amount usually of 0.1 to 15 parts, preferably 0.3 to 10 parts, particularly 0.5 to 5 parts based on 100 parts as the total of a crosslinked rubber particle component and a non-crosslinked rubber component. The incorporation of the crosslinking agent in an amount ratio within the range specified above results in sufficiently improved tensile strength and wearing resistance, and the like.

A vulcanization promoter may for example be a sulfenamide-based vulcanization promoter such as N-cyclohexyl-2-benzothiazolesulfenamide, N-t-butyl-2-benzothiazolesulfenamide, N-oxyetyhlene-2-benzothiazolesulfenamide and N,N'-diisopropyl-2-benzothiazolesulfenamide, a guanidine-based vulcanization promoter such as diphenylguanidine, diorthotolylguanidine and orthotolylbiguanidine and a thiourea-based vulcanization promoter such as thiocarboanilide, diorthotolylthiourea, ethylene thiourea, diethylthiourea and trimethylthiourea;

a thiazol-based vulcanization promoter such as 2-mercaptobenzothiazol, dibenzothiazyldisulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole and thiuram-based vulcanization promoter such as tetramethylthiuram monosulfide, tetramethylthiuram disulfide, tetraethylthiuram disulfide, tetrabutylthiuram disulfide and dipentamethylenethiuram tetrasulfide;

a dithiocarbamate-based vulcanization promoter such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethylamine diethyldithiocarbamate, piperidine pentamethylene dithiocarbamate and pipecolin methylpentamethylene dithiocarbamate and xanthate-based vulcanization promoter such as sodium isopropylxanthate, zinc isopropylxanthate and zinc butylxanthate, and the like.

Any of these vulcanization promoters may be employed alone or in combination of two or more, and a combination of different types may also be used. It is particularly preferred to use as a vulcanization promoter at least a sulfenamide-based vulcanization promoter. The amount of a vulcanization promoter to be added is 0.1 to 15 parts, preferably 0.3 to 10 parts, more preferably 1 to 10 parts based on 100 parts as the total of a crosslinked rubber particle component and a non-crosslinked rubber component.

As a vulcanization activator, a higher fatty acid such as stearic acid and a zinc oxide, and the like can be employed. A preferred zinc oxide is one having a high surface activity and a particle size of 5 $\mu$m or less. Such zinc oxide may for example be an activated zinc oxide powder whose particle size is 0.05 to 0.2 $\mu$m or a zinc oxide powder whose particle size of 0.3 to 1 $\mu$m and the like. Those which may also be employed are an amine-based dispersant and a zinc oxide whose surface is treated with a humectant and the like.

Any of these vulcanization may be employed alone or in combination of two or more, and a combination of different types may also be used. A vulcanization activator may be added in an appropriate amount in view of its type, and when a higher fatty acid is used it is added in an amount of 0.05 to 15 parts, preferably 0.1 to 10 parts, more preferably 0.5 to 5 parts based on 100 parts as the total of crosslinked rubber particle and non-crosslinked rubber components. When a zinc oxide is used, it is added in an amount of 0.05 to 10 parts, preferably 0.1 to 7 parts, more preferably 0.5 to 5 parts. An amount within the range specified above is particularly preferred since it results in an extremely well-balanced improvement in the processability of a rubber composition and the tensile strength and the wearing resistance, and the like of a vulcanized rubber.

Such vulcanized rubber can be used as a rubber product in various industrial fields due to its excellent characteristics.

A rubber composition of the invention and a rubber product made therefrom can be produced as described below.

First, a crosslinked rubber particle, non-crosslinked rubber component, a reinforcing agent such as a silica, a carbon black and a carbon-silica dual-phase filler, and the like, a rubber extending oil and other auxiliary components, and the like are kneaded using a kneader such as Banbury mixer or the like at a temperature of 70 to 180° C. Subsequently, the kneaded mixture is cooled and combined with a vulcanizing agent and a vulcanization promoter, and the like such as a sulfur using Banbury mixer or a mixing roll or the like to mold into a desired shape. A vulcanization at a temperature of 140 to 180° C. is then effected to obtain a desired vulcanized rubber, i.e., a rubber product.

Excellent property of this vulcanized rubber makes this rubber composition useful as a rubber product in various industrial fields. For example, it can be used as a material for an industrial product such as a rubber roll, a grinding roll, a belt, a hose, a sponge, a rubber board and a rubber-coated fabric, and the like, a shoe part for example of a transparent shoe, an ordinary colored shoe and a sponge-soled shoe, and the like, a tire of a large-sized or small-sized car such as a tread, a base tread, a side wall and a rubber chaser, and the like, and a sanitary material such as a contraceptive rubber and a health care product, and the like.

DESCRIPTION OF THE PREFERRED EMBODIMENTS

The present invention is further described in the following Examples.

(1) Crosslinked rubber particle production

A polymerization reactor was charged with 200 parts of water, 4.5 parts of rosin acid soap and a monomer having each composition shown in Table 1 (in which the unit is "part"). Subsequently, the temperature of the polymerization reactor was set at 5° C., and 0.1 parts of p-menthane hydroperoxide as a radical initiator, 0.07 parts of sodium ethylenediamine tetracetate, 0.05 parts of ferrous sulfate heptahydrate and 0.15 parts of sodium formaldehyde sulfoxylate were added and the polymerization was continued for 12 hours to obtain an emulsion containing a crosslinked rubber particle. The polymerization conversion rate was about 100%.

Subsequently, this emulsion was coagulated using sulfuric acid and a salt to form crumb, which was then dried using a hot blast drier to obtain each of the crosslinked rubber particles 1 to 5 having the monomer compositions shown in Table 1.

TABLE 1

| Crosslinked rubber particle | 1 | 2 | 3 | 4 | 5 |
|---|---|---|---|---|---|
| Raw material | | | | | |
| Butadiene | 73 | 68 | 68 | 68 | 68 |
| Styrene | 25 | 25 | 25 | 25 | 25 |
| Divinylbenzene | 2 | 2 | 2 | 2 | 2 |
| Diethylaminoethyl methacrylate | | 5 | | | |
| 2-Hydroxyethyl methacrylate | | | 5 | | |
| Glycidyl methacrylate | | | | 5 | |
| Methacrylic acid | | | | | 5 |

(2) Non-crosslinked rubber component production

A polymerization reactor was charged with 200 parts of water, 4.5 parts of rosin acid soap, a monomer having each composition shown in Table 2 (in which the unit in Table 2 is "part") and 0.1 parts of tertiary-dodecylmercaptane. Subsequently, the temperature of the polymerization reactor was set at 5° C., and 0.1 parts of p-menthane hydroperoxide as a radical initiator, 0.07 parts of sodium ethylenediamine tetracetate, 0.05 parts of ferrous sulfate heptahydrate and 0.15 parts of sodium formaldehyde sulfoxylate were added and the polymerization was initiated. When the polymerization conversion rate reached 60%, diethylhydroxylamine was added to terminate the polymerization, and an unreacted monomer was recovered by a steam stripping to obtain an emulsion containing an acrylonitrile-styrene-butadiene copolymeric rubber.

Subsequently, this emulsion was coagulated using sulfuric acid and a salt to form crumb, which was then dried using a hot blast drier to obtain each of the non-crosslinked rubber components having the monomer compositions shown in Table 2 (hereinafter referred to as "Non-crosslinked rubber component 3"). The weight-average molecular weight of each of the non-crosslinked rubber component 3" was determined by a GPC, and represented as a standard polystyrene. The results are included in Table 2.

Each of the following four non-crosslinked rubbers was also employed as a non-crosslinked rubber component.

① Solution polymerization styrene-butadiene copolymeric rubber, JSR Co., Ltd., Trade name: "JSR SL574", Styrene content; 15% by weight ② Acrylonitrile-butadiene copolymeric rubber, JSR Co., Ltd., Trade name: "JSR N230S", Acrylonitrile content; 35% by weight ④ Polybutadiene rubber, JSR Co., Ltd., Trade name: "JSR BR01"

⑤ Ethylene-propylene-5-ethylidene-2-norbornene copolymeric rubber, JSR Co., Ltd., Trade name: "JSR EP33", Ethylene content; 52% by weight, 5-ethylidene-2-norbornene content; 8.1% by weight In Table 2, the non-conjugated polyene in non-crosslinked rubber component 5 was 5-ethylidene-2-norbornene.

TABLE 2

| Non-crosslinked rubber component | 1 | 2 | 3 | 4 | 5 |
|---|---|---|---|---|---|
| Raw Material | | | | | |
| Butadiene | SBR | NBR | 60 | BR | EPDM |
| Styrene | | | 32 | | |
| Acrylonitrile | | | 8 | | |
| Polymerization conversion (%) | | | 60 | | 0.7 |
| Styrene content (wt %) | 15 | | 25 | | |
| Acrylonitrile content (wt %) | | 35 | 10 | | |
| Ethylene content (wt %)/Iodine value | | | | | 52/26 |
| Butadiene unit | | | | | |
| 1,2-Vinyl content (%) | 57 | | | | |
| 1,4-Trans content (%) | 27 | | | | |
| Weight-average molecular weight (×10⁴) | | | 69 | | |

The content of each monomer in Table 2 was determined by the methods described below.

(a) Styrene content (% by weight); A calibration curve made by an infrared absorption spectroscopy was employed.

(b) Acrylonitrile content (% by weight); A rubber was dissolved in toluene and re-precipitated from methanol, and this procedure was repeated twice to purify the rubber, which was then dried in vacuum, subjected to an elemental analysis to obtain a nitrogen content, from which the content was calculated.

(c) Ethylene content (% by weight); $^{13}$C-NMR spectrum was employed.

(d) Iodine value; IR spectroscopy was employed.

(e) Vinyl content and 1,4-trans content of butadiene unit (% by weight); An infrared absorption spectroscopy (*MORELLO* method) was employed.

The results are included in Table 2.

(3) Wet mixing of crosslinked rubber particle and non-crosslinked rubber component An emulsion containing crosslinked rubber particle 3 shown in Table 1 and an emulsion containing non-crosslinked rubber component 3 shown in Table 2 were mixed in a solid weight ratio of 1:9. Subsequently, the mixture was coagulated using sulfuric acid and a salt to form crumb, which was then dried using a hot blast drier to obtain a wet mixing rubber. This wet mixing process allows the crosslinked rubber particle and the non-crosslinked rubber component to be mixed more uniformly when compared with a dry mixing process.

(4) Production of rubber composition and vulcanized rubber

A crosslinked rubber particle shown in Table 1, a non-crosslinked rubber component shown in Table 2 and a wet mixing rubber obtained in Section (3) described above were employed in a formulation shown in Tables 3 to 5 and kneaded using a LABOPLASTMILL (TOYOSEKI Co., Ltd.) to obtain each of the rubber compositions of Examples 1 to 11 shown in Tables 3 to 5. Subsequently, each composition was vulcanized using a vulcanization press at 160° C. for 20 minutes to obtain a vulcanized rubber. Furthermore, a non-crosslinked rubber component was used alone without any crosslinked rubber particle to obtain each of the rubber compositions of Comparatives 1 to 6 shown in Tables 3 to 5 in a similar manner, which was then vulcanized also similarly.

TABLE 3

|  |  | Example |  |  |  |  |  | Comparative |  |
|---|---|---|---|---|---|---|---|---|---|
|  |  | 1 | 2 | 3 | 4 | 5 | 6 | 1 | 2 |
| Crosslinked rubber particle | 1 | 10 |  |  |  |  |  |  |  |
|  | 2 |  | 10 |  |  |  |  |  |  |
|  | 3 |  |  | 10 | 10 |  |  |  |  |
|  | 4 |  |  |  |  | 10 |  |  |  |
|  | 5 |  |  |  |  |  | 10 |  |  |
| Non-crosslinked rubber component | 1 | 90 | 90 | 90 | 90 | 90 | 90 | 100 | 100 |
| Silica |  | 50 | 50 | 50 | 50 | 50 | 50 | 50 | 50 |
| Carbon black |  | 10 | 10 | 10 | 10 | 10 | 10 | 10 | 10 |
| Silane coupling agent (a) |  | 5 | 5 | 5 | 2.5 | 5 | 5 | 5 | 5 |
| Zinc oxide |  | 3 | 3 | 3 | 3 | 3 | 3 | 3 | 3 |
| Stearic acid |  | 2 | 2 | 2 | 2 | 2 | 2 | 2 | 2 |
| Anti-aging agent |  | 1 | 1 | 1 | 1 | 1 | 1 | 1 | 1 |
| Sulfur |  | 1.5 | 1.5 | 1.5 | 2.2 | 1.5 | 1.5 | 1.5 | 2.2 |
| Vulcanization promoter | (a) | 1.5 | 1.5 | 1.5 | 1.5 | 1.5 | 1.5 | 1.5 | 1.5 |
|  | (b) | 1 | 1 | 1 | 1 | 1 | 1 | 1 | 1 |
| Processability |  | ⊚ | ⊚ | ⊚ | ⊚ | ⊚ | ⊚ | ○ | Δ |
| Shrinkage of unvulcanized rubber sheet |  | ⊚ | ⊚ | ⊚ | ⊚ | ⊚ | ○ | Δ | x |
| Elongation (%) |  | 530 | 550 | 570 | 530 | 540 | 570 | 590 | 350 |
| Tensile strength (MPa) |  | 16 | 15 | 16 | 14 | 17 | 17 | 17 | 14 |
| Wearing resistance |  | 4 | 5 | 5 | 4 | 5 | 4 | 4 | 2 |

TABLE 4

|  |  | Example |  |  | Comparative |  |
|---|---|---|---|---|---|---|
|  |  | 7 | 8 | 9 | 3 | 4 |
| Crosslinked rubber | 3 | 10 | 10 |  |  |  |
| Non-crosslinked rubber component | 2 | 90 |  |  | 100 |  |
|  | 3 |  | 90 |  |  | 100 |
| Wet mixing rubber |  |  |  | 100 |  |  |
| Silica |  | 50 | 50 | 50 | 50 | 50 |
| Silane coupling agent (b) |  | 0.5 | 0.5 | 0.5 | 0.5 | 0.5 |
| Zinc oxide |  | 3 | 3 | 3 | 3 | 3 |
| Stearic acid |  | 2 | 2 | 2 | 2 | 2 |
| Anti-aging agent |  | 1 | 1 | 1 | 1 | 1 |
| Sulfur |  | 1.5 | 1.5 | 1.5 | 1.5 | 2.2 |
| Vulcanization promoter | (a) | 1.5 | 1.5 | 1.5 | 1.5 | 1.5 |
|  | (b) | 1 | 1 | 1 | 1 | 1 |
| Processability |  | ⊚ | ⊚ | ⊚ | ○ | ○ |
| Shrinkage of unvulcanized rubber sheet |  | ⊚ | ⊚ | ⊚ | Δ | x |
| Elongation (%) |  | 490 | 550 | 560 | 500 | 550 |
| Tensile strength (MPa) |  | 21 | 20 | 21 | 22 | 20 |
| Wearing resistance |  | 4 | 4 | 5 | 3 | 2 |

TABLE 5

|  |  | Example |  | Comparative |  |
|---|---|---|---|---|---|
|  |  | 10 | 11 | 5 | 6 |
| Crosslinked rubber particle | 3 | 10 | 10 |  |  |
| Non-crosslinked rubber component | 4 | 90 |  | 100 |  |
|  | 5 |  | 90 |  | 100 |
| Silica |  | 50 | 50 | 50 | 50 |
| Silane coupling agent (b) |  | 0.5 | 0.5 | 0.5 | 0.5 |
| Zinc oxide |  | 3 | 3 | 3 | 3 |
| Stearic acid |  | 2 | 2 | 2 | 2 |
| Anti-aging agent |  | 1 | 1 | 1 | 1 |
| Sulfur |  | 1.5 | 1.5 | 2.2 | 2.2 |
| Vulcanization promoter | (a) | 1.5 | 1.5 | 1.5 | 1.5 |
|  | (b) | 1 | 1 | 1 | 1 |
| Processability |  | ⊚ | ⊚ | ○ | ○ |
| Shrinkage of unvulcanized rubber sheet |  | ○ | ○ | Δ | Δ |
| Elongation (%) |  | 590 | 590 | 600 | 470 |
| Tensile strength (MPa) |  | 21 | 21 | 22 | 13 |
| Wearing resistance |  | 5 | 5 | 4 | 4 |

The components incorporated in the formulations described above were as follows.

① Silica; NIPPON SILICA INDUSTRIAL Co., Ltd., Trade name: "NIPSIL VN3"

② Carbon black; MITSUBISHI CHEMICAL Co., Ltd., Trade name: "DIABLACK N220"

③ Silane coupling agent; (a) DEGUSAHULS, Tradename "Si69", (b) GE TOSHIBA SILICON Co., Ltd., Trade name: "TSL8380"

④ Anti-aging agent; OUCHISHINKO CHEMICAL INDUSTRIAL Co., Ltd., Trade name: "NOCRAC 810NA"

⑤ Vulcanization promoter; (a) OUCHISHINKO CHEMICAL INDUSTRIAL Co., Ltd., Trade name: "NOCCELER CZ", (b); OUCHISHINKO CHEMICAL INDUSTRIAL Co., Ltd., Trade name: "NOCCELER D"

Each of the rubber compositions and the vulcanized rubbers was examined for its physical characteristics by the methods shown below.

(A) Processability; A rubber composition was evaluated based on its winding around a roll upon kneaded using the roll. The evaluation criteria are shown below.

⊚ Excellent with no separation form roll surface. ○: Satisfactory with slight separation. Δ: Poor winding with frequent separation. x: Extremely poor with almost no winding.

(B) Shrinkage of unvulcanized rubber sheet; Evaluation was based on the degree of the shrinkage of an unvalcanized rubber sheet after kneading a rubber composition by a roll and also based on the surface condition when observed visually. The evaluation criteria are shown below.

⊚: Excellent with extremely low shrinkage and smooth and glossy surface of unvalucanized rubber sheet. ○: Satisfactory with slight shrinkage and smooth surface of unvalucanized rubber sheet. Δ: Poor with shrinkage. x: Extremely poor with extremely high shrinkage and crack in edge of unvulcanized rubber sheet.

(C) Tensile characteristics: In accordance with JIS K 6301 using a type 3 test piece, the elongation at break (%)

and the tensile strength (MPa) were determined at 25° C. and the tensile speed of 500 mm/min.

(D) Wearing resistance; An AKRON wearing tester was employed for the determination in accordance with JIS K 6264. The results were represented as one of the integers from 0 (extensive wearing) to 5 (extremely low wearing).

The results of the evaluation are included in Tables 3 to 5.

As results from Tables 3 to 5, each of the rubber compositions of Examples 1 to 11 exhibited excellent processability and dimension stability, and gave a vulcanized rubber having satisfactorily large elongation and tensile strength together with a satisfactory wearing resistance which scored 4 or 5. On the other hand, each of Comparatives 1 to 6 using no crosslinked rubber particle exhibited a reduced dimension stability, and the wearing resistance especially in Comparatives 2 and 4 scored as poor as 2.

What is claimed is:

1. A rubber composition comprising
  A. at least one of (1) a crosslinked rubber particle comprising polymerized units of (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated groups and (d) 0.1 to 30% by weight of a monomer unit having one polymerizable unsaturated group and at least one functional group selected from the group consisting of an amino group, a hydroxyl group and an epoxy group, wherein the crosslinked rubber particle has a particle size of 10 to 500 nm and a toluene-insolubles of 80% by weight or more; or
  (2) a crosslinked rubber particle comprising polymerized units of (a) 30 to 94.89% by weight of a conjugated diene unit, (b) 5 to 69.89% by weight of an aromatic vinyl unit, (c) 0.01 to 10% by weight of a monomer unit having at least two polymerizable unsaturated groups and (e) 0.1 to 30% by weight of a monomer unit having one polymerizable unsaturated group and a carboxylic group, wherein the total amount of (a), (b), (c) and (e) is 100% by weight and having a particle size of 10 to 500 nm and a toluene-insolubles of 80% by weight or more;
and,
  B. a non-crosslinked rubber component having a toluene-insolubles of less than 20% by weight, wherein said non-crosslinked rubber component is at least one selected from the group consisting of (B 1) a polymer having only a conjugated diene unit as a repeating unit, (B2) a polymer which comprises as repeating units a conjugated diene unit and an aromatic vinyl unit and wherein the conjugated diene unit has a 1,4-trans content of 55% or less, (B3) a polymer comprising as repeating units a conjugated diene unit and an α,β-unsaturated nitrile unit, (B4) an acrylic rubber, and (B5) a polymer comprising as repeating units an ethylene unit and an α-olefin unit having 3 to 12 carbon atoms.

2. The rubber composition according to claim 1, wherein
said conjugated diene unit (a) is at least one selected from the group consisting of 1,3-butadiene, 2,3-dimethyl-1,3-butadiene, isoprene and chloroprene;
said aromatic vinyl unit (b) is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butyistyrene and tert-butoxystyrene; and,
said monomer unit (c) having at least two polymerizable unsaturated groups is at least one selected from the group consisting of ethylene glycol di(meth)acrylate, propylene glycol di(meth)acrylate, 1,4-butanediol di(meth)acrylate, 1,6-hexanediol di(meth) acrylate, trimethylolpropane di(meth)acrylate, trimethyloipropane tri(meth)acrylate, pentaerythritol tri(meth)acrylate, pentaerythritol tetra(meth)acrylate, divinylbenzene, diisopropenylbenzene and trivinylbenzene.

3. The rubber composition according to claim 2, wherein
said monomer unit (d) has an amino group and is at least one selected from the group consisting of a dialkylaminoalkyl (meth)acrylate, an N-dialkylaminoalkyl group-containing unsaturated amide and a tertiary amino group-containing vinyl aromatic compound.

4. The rubber composition according to claim 2, wherein
said monomer unit (d) has a hydroxyl group and is at least one selected from the group consisting of a hydroxyalkyl (meth)acrylate, a mono (meth)acrylate of a polyalkylene glycol having 2 to 23 alkylene glycol units, a hydroxyl group-containing unsaturated amide, a hydroxyl group-containing vinyl aromatic compound and (meth)allyl alcohol.

5. The rubber composition according to claim 2, wherein
said monomer unit (d) has an epoxy group and is at least one selected from the group consisting of (meth)allylglycidylether, glycidyl (meth)acrylate and 3,4-oxycyclohexyl (meth)acrylate.

6. The rubber composition according to claim 1, wherein
said monomer unit (e) having one polymerizable unsaturated group and a carboxylic group is at least one selected from the group consisting of a unsaturated carboxylic acid, a free carboxyl group-containing ester and a salt thereof.

7. The rubber composition according to claim 1, further comprising at least one selected from the group consisting of a silica and a carbon black.

8. The rubber composition according to claim 7, wherein
said conjugated diene unit (a) is at least one selected from the group consisting of 1,3-butadiene, 2,3-dimethyl-1,3-butadiene, isoprene and chloroprene;
said aromatic vinyl (b) is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butyistyrene and tert-butoxystyrene; and,
said monomer unit (c) having at least two polymerizable unsaturated groups is at least one selected from the group consisting of ethylene glycol di(meth)acrylate, propylene glycol di(meth)acrylate, 1,4-butanediol di(meth)acrylate, 1,6-hexanediol di(meth)acrylate, trimethyloipropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene.

9. The rubber composition according to claim 8, wherein
said monomer unit (e) having one polymerizable unsaturated group and a carboxylic group is at least one selected from the group consisting of an unsaturated carboxylic acid, a free carboxyl group-containing ester and a salt thereof.

10. The rubber composition according to claim 7, further comprising a silane coupling agent.

* * * * *